United States Patent
Wang et al.

(10) Patent No.: US 12,240,103 B2
(45) Date of Patent: Mar. 4, 2025

(54) ROBOT INTEGRATED JOINT UNIT AND LEGGED ROBOT APPLYING SAME

(71) Applicant: HangZhou YuShu TECHNOLOGY CO., LTD., Hangzhou (CN)

(72) Inventors: Xingxing Wang, Hangzhou (CN); Zhiyu Yang, Hangzhou (CN)

(73) Assignee: HANGZHOU YUSHU TECHNOLOGY CO., LTD., Zhejiang (CN)

( * ) Notice: Subject to any disclaimer, the term of this patent is extended or adjusted under 35 U.S.C. 154(b) by 161 days.

(21) Appl. No.: 17/433,966

(22) PCT Filed: Feb. 24, 2020

(86) PCT No.: PCT/CN2020/076440
§ 371 (c)(1),
(2) Date: Aug. 25, 2021

(87) PCT Pub. No.: WO2020/177565
PCT Pub. Date: Sep. 10, 2020

(65) Prior Publication Data
US 2022/0143846 A1    May 12, 2022

(30) Foreign Application Priority Data
Mar. 7, 2019  (CN) .......................... 201910172037.5

(51) Int. Cl.
*B25J 17/02*    (2006.01)
*B25J 9/10*     (2006.01)
(Continued)

(52) U.S. Cl.
CPC .......... *B25J 17/0233* (2013.01); *B25J 9/102* (2013.01); *B25J 13/088* (2013.01); *B25J 19/0045* (2013.01); *B62D 57/032* (2013.01)

(58) Field of Classification Search
CPC ..... B25J 9/06; B25J 9/102; B25J 9/106; B25J 9/126; B25J 13/088; B25J 17/0233;
(Continued)

(56) References Cited

U.S. PATENT DOCUMENTS

| | | | |
|---|---|---|---|
| 10,144,464 B1 | 12/2018 | Berger et al. | |
| 2007/0276538 A1* | 11/2007 | Kjellsson | B25J 19/0025 901/14 |

(Continued)

FOREIGN PATENT DOCUMENTS

| | | | | |
|---|---|---|---|---|
| CN | 106904226 A | * | 6/2017 | ............. B25J 17/00 |
| CN | 207027509 U | | 2/2018 | |

(Continued)

OTHER PUBLICATIONS

CN 106904226 A (Xing-xing Wang) Jun. 30, 2017 (full text). [online] [retrieved on May 18, 2023]. Retrieved from: Clarivate Analytics. (Year: 2017).*

(Continued)

*Primary Examiner* — Joseph Brown
(74) *Attorney, Agent, or Firm* — MUNCY, GEISSLER, OLDS & LOWE, P.C.

(57) ABSTRACT

A robot integrated joint unit and a legged robot applying same are related to the technical field of robot joints. The robot integrated joint unit comprises a first electric motor and reducer assembly, a second electric motor assembly, a second reducer assembly, and a first output connecting rod. Two motors of two joints are disposed on a same side of the joints, thus preventing the need for electric motor power cables to run through the joints, effectively alleviating fatigue damage of the electric motor power cables, and extending the service life of the electric motor cables. The electric motor components and the joint connecting rod obviate the need to reserve dedicated cable through holes and a cable placement mechanism, thus allowing enhanced structural reliability; further increasing the degree of integration of a dual joint unit, reducing the axial size of the joint unit, and enhancing structural visual appeal.

2 Claims, 6 Drawing Sheets

(51) Int. Cl.
*B25J 13/08* (2006.01)
*B25J 19/00* (2006.01)
*B62D 57/032* (2006.01)

(58) Field of Classification Search
CPC .. B25J 17/0241; B25J 17/025; B25J 19/0041; B25J 19/0045; B62D 57/032; H02K 7/116; H02K 16/00
See application file for complete search history.

(56) References Cited

U.S. PATENT DOCUMENTS

2010/0187929 A1* 7/2010 Hishida .................. H02K 16/00
310/112
2012/0264563 A1* 10/2012 Chen ........................ F16H 1/32
475/344

FOREIGN PATENT DOCUMENTS

| CN | 207683655 U | | 8/2018 | |
|---|---|---|---|---|
| CN | 108556951 A | * | 9/2018 | ........... B62D 57/032 |
| CN | 109176595 A | | 1/2019 | |
| CN | 109941369 A | | 6/2019 | |
| CN | 209408531 U | | 9/2019 | |
| CN | 209921456 U | | 1/2020 | |
| WO | WO-2018100953 A1 | * | 6/2018 | ............... F16D 7/02 |

OTHER PUBLICATIONS

WO 2018100953 A1 (Takushi Matsuto) Jun. 7, 2018 (full text). [online] [retrieved on May 18, 2023]. Retrieved from: Clarivate Analytics. (Year: 2018).*

* cited by examiner

ROBOT INTEGRATED JOINT UNIT AND LEGGED ROBOT APPLYING SAME

TECHNICAL FIELD

The present application relates to a robot integrated joint unit and a legged robot applying the same, belonging to the technical field of robot joints.

BACKGROUND

At present, a power unit for a robot generally adopts a structure consisting of independent joint units connected in series or parallel. Especially in the field of legged robots, each leg of the robot usually uses a structure consisting of independent joint units connected in series.

For a dual joint unit requiring a compact structure, especially for the scenario of application to a legged robot, two motors of the existing dual joint unit are disposed on the two sides of a rotary joint. In order to ensure the normal operation of the two motors, the wire arrangement must be considered.

There are mainly two wire arrangements at present. One is non-hollow wiring mode, in which wires are directly hung outside the robot joint, but they affect the safety and attractiveness of the robot structure, and the wires are very apt to be damaged. At the same time, if the wire arrangement is unreasonable, it will affect the movement range of the joint. The other is hollow wiring, in which motor components and a joint connecting rod need to reserve special wire through holes and a cable placement mechanism, which increases the complexity and space size of the joint. At the same time, the movement of the joint will cause wear and fatigue damage to the wires, which affect the service life of the wires.

Further, due to the complex and changeable terrain of the ground or the impact interference force from the outside, when the driving torque of the robot joint motor is greater than the maximum torque that a joint reducer can bear, or the maximum torque transmitted to the reducer through a reducer output shaft from the outside is greater than the maximum torque that the joint reducer can bear, the reducer of the robot joint will be in an overload working state, which will lead to the damage of reducer gear and other joint parts. Moreover, since the robot joint works in a reciprocating mode for a long time under many working conditions, and needs to bear the impact load from the ground or external environment, the meshing tooth face of each tooth of the reducer will have serious uneven wear.

SUMMARY

In view of the defects of the prior art, one purpose of the present application is to provide a more reliable and attractive robot integrated joint unit with dual motors assembled on the same side of a rotary joint, avoiding the need for motor wires to connect through the rotary joint, and prolonging the service life of motor cable wires, and a legged robot applying the same.

Another purpose of the present application is to provide a robot integrated joint unit which can rub and slip, realize torque limitation, is suitable for a variety of complex working conditions, and will not cause damage to joint parts when the joint bears impact load, and a legged robot applying the same.

In order to realize the above purposes, the present application adopts the following technical solutions:

A robot integrated joint unit, including a first motor and reducer assembly, a second motor assembly, a second reducer assembly and a first output connecting rod, wherein a first output connecting rod is mounted on one side of an output shaft end of the first motor and reducer assembly; the second motor assembly is fixedly mounted on the other side of the first motor and reducer assembly; the second reducer assembly is disposed in the first output connecting rod; an output shaft of the second motor assembly passes through the first motor and reducer assembly and is fixedly connected with an input end of the second reducer assembly.

The dual motors of the dual joints of the present application are on the same side of the joints, avoiding the need for the motor power cable to pass through the joints, effectively alleviating the fatigue damage of the motor power cable and prolonging the service life of the motor cable wires. The motor assembly and joint output connecting rod of the present application do not need to reserve special wiring holes and a cable placement mechanism, thus making the structure more reliable, further improving the degree of integration of the dual joint unit, reducing the axial size of the joint unit, and making the structure more attractive.

As a further improved technical measure, the first motor and reducer assembly and the second motor assembly are assembled on an inner side of the first output connecting rod. The first output connecting rod is on the outer side, thus effectively protecting the joint motor, preventing the joint motor from being damaged by foreign objects, and prolonging the service life of the first motor and reducer assembly and the second motor assembly.

A technical solution for implementing the other purpose of the present application is as follow: the first motor and reducer assembly and the second reducer assembly are respectively equipped with a torque limiter. The present application limits the torque borne by the reducer assembly, thus preventing the reducer assembly from being damaged due to bearing a large torque from the motor end or the output end of the joint unit, so that the present application can be applied to various complex working conditions, and prevent external impact torque at the joint output end from damaging the reducer and other parts in the joint unit. In addition, the slip situation during the operation of the torque limiters can balance the wear of the reducer in daily operation and avoid uneven wear of the meshing tooth face of each tooth of the reducer.

As a further improved technical measure, the torque limiter of the first motor and reducer assembly includes a first friction disc, a first disc pad and a first friction force generator; the torque limiter of the second reducer assembly includes a second friction disc, a second disc pad and a second friction force generator; the first friction force generator and the second friction force generator each include but are not limited to a disc spring, a wave spring and a coil spring. The structure is simple, compact and reliable, and the cost is low.

As a further improved technical measure, the first motor and reducer assembly is provided with a first motor encoder and a first output encoder; the second motor assembly is provided with a second motor encoder; the second reducer assembly is provided with a second output encoder; the first motor encoder includes a first motor encoder stator and a first motor encoder rotor; the first output encoder includes a first output encoder stator and a first output encoder rotor; the second motor encoder includes a second motor encoder stator and a second motor encoder rotor; the second output encoder includes a second output encoder stator and a second output encoder rotor. Using dual encoders can more accurately detect the rotation angle of the motor and the rotation angle of the joint output end at the same time, thus improving the controlled performance of the joint. In addition, the dual encoders can accurately detect the rotation angle of the joint output end when the torque limiter of the joint has a limiting effect, that is, when the reducer assembly slips.

As a further improved technical measure, the robot integrated joint unit further includes a wireless electric energy transmission component and a wireless signal transmission component for power supply to and communication with components on the first output connecting rod and other components subsequently connected with the first output connecting rod; the wireless electric energy transmission component includes an electric energy transmitting coil and an electric energy receiving coil; a wireless transmission mode adopted by the wireless signal transmission component includes but is not limited to radio, infrared and laser. The wireless electric energy transmission component can also bear the function of wireless communication according to the actual needs. Wireless electric energy transmission and wireless information transmission between the rotating joints are realized, the joint jumper cable is omitted, the continuous rotation of the joint is realized, and the working space of the joint is increased.

As a further improved technical measure, the wireless electric energy transmission component and the wireless signal transmission component are disposed between the first motor and reducer assembly and the first output connecting rod, or are disposed in the first motor and reducer assembly. Wireless transmission of electric energy and signals is realized, the mounting position can be selected according to the actual needs, the application scope is wide, and it helps to improve the degree of integration of the joint unit.

As a further improved technical measure, a motor driver and a motor heat conduction and dissipation component are fixed on the first motor and reducer assembly and the second motor assembly. The degree of integration of the joint unit is further improved, the heat dissipation effect of the joint unit is better, and it is conducive to the high-power output of the joint unit.

As a further improved technical measure, a joint adapter is fixed on a housing of the first motor and reducer assembly; one end of the joint adapter fixedly connected with the first motor and reducer assembly is provided with a concave structure. By unscrewing the screws for fixing the joint adapter and the first motor and reducer assembly only, the disassembly and assembly of the dual joint unit and the joint adapter can be realized, the structure is compact and reliable, and the weight is light.

As a further improved technical measure, the first motor and reducer assembly is provided with a first reducer assembly; the first reducer assembly and the second reducer assembly are respectively a planetary reducer; planetary gears of the first reducer assembly and the second reducer assembly are dual gears; outer rings of inner gear rings of the first reducer assembly and the second reducer assembly are respectively and frictionally connected with the first friction disc and the second friction disc. The planetary reducer has a simple structure and the cost is low. Compared with the general single planetary reducer, the planetary reducer with dual gears has a larger adjustable range of reduction ratio. Since the outer rings of the inner gear rings of the planetary reducers are directly connected with the friction discs, the structure is simple, compact and reliable.

As a further improved technical measure, the first motor and reducer assembly and the second motor assembly adopt an outer rotor motor. The outer rotor motor process is simple and the cost is low.

As a further improved technical measure, a legged robot includes the robot integrated joint unit. The dual motors of the dual joints of the legged robot are on the same side of the joints, avoiding the need for the motor power cable to pass through the joints, effectively alleviating the fatigue damage of the motor power cable and prolonging the service life of the motor cable wires. The motor assembly and joint output connecting rod of the present application do not need to reserve special wiring holes and a cable placement mechanism, thus making the structure more reliable, further improving the degree of integration of the robot, reducing the axial size of the joint unit, and making the structure more attractive.

The first motor and reducer assembly and the second reducer assembly of the legged robot provided by the present application are respectively provided with a torque limiter, which can limit the torque borne by the reducer assembly, thus preventing the reducer assembly from being damaged due to bearing a large torque from the motor end or the output end of the joint unit, so that the present application can be applied to various complex working conditions, and prevent external impact torque at the joint output end from damaging the reducer and other parts in the joint unit. In addition, the slip situation during the operation of the torque limiters can balance the wear of the reducer in daily operation and avoid uneven wear of the meshing tooth face of each tooth of the reducer.

Compared with the prior art, the present application has the following beneficial effects:

The dual motors of the dual joints of the present application are on the same side of the joints, avoiding the need for the motor power cable to pass through the joints, effectively alleviating the fatigue damage of the motor power cable and prolonging the service life of the motor cable wires. The motor assembly and joint connecting rod of the present application do not need to reserve special wiring holes and a cable placement mechanism, thus making the structure more reliable, further improving the degree of integration of the dual joint unit, reducing the axial size of the joint unit, and making the structure more attractive.

The first motor and reducer assembly and the second reducer assembly of the present application are respectively provided with a torque limiter, which can limit the torque borne by the reducer assembly, thus preventing the reducer assembly from being damaged due to bearing a large torque from the motor end or the output end of the joint unit, so that the present application can be applied to various complex working conditions, and prevent external impact torque at the joint output end from damaging the reducer and other parts in the joint unit. In addition, the slip situation during the operation of the torque limiters can balance the wear of the reducer in daily operation and avoid uneven wear of the meshing tooth face of each tooth of the reducer.

Figure 1:
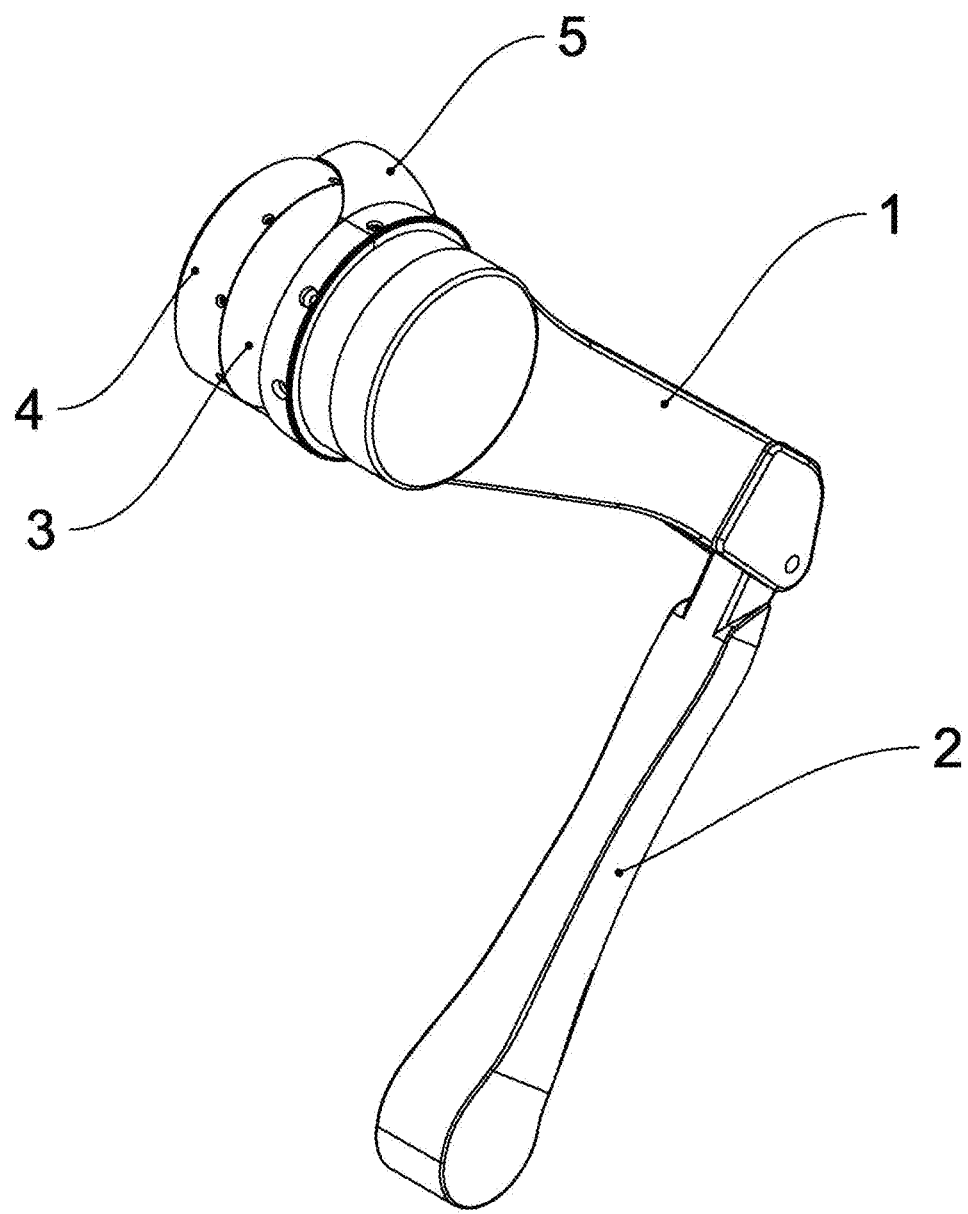
FIG. 1 illustrates a schematic view of an overall structure of the present application.

In the drawings, 1—first output connecting rod; 11—first housing; 12—second housing; 2—second output connecting rod; 3—first motor and reducer assembly; 30—first reducer assembly; 31—first motor housing; 32—first motor stator and winding; 33—first motor rotor; 34—first output shaft; 35—first sun gear; 36—first planetary gear; 37—first inner gear ring; 38—first motor base; 39—first friction force generator; 310—first disc pad; 311—first friction disc; 4—second motor assembly; 40—second reducer assembly; 41—second motor housing; 42—second motor stator and winding; 43—second motor rotor; 44—second output shaft; 45—second friction force generator; 46—second friction disc; 47—second disc pad; 48—second inner gear ring; 49—pressing plate; 5—joint adapter; 6—connecting rod; 7—joint output rocker arm; 81—electric energy transmitting coil; 82—electric energy receiving coil; 91—first motor encoder stator; 92—first motor encoder rotor; 93—second motor encoder stator; 94—second motor encoder rotor; 95—first output encoder stator; 96—first output encoder rotor; 97—second output encoder stator; 98—second output encoder rotor; 10—heat conduction member; 101—heat conduction groove.

DESCRIPTION OF THE EMBODIMENTS

In order to make the purposes, technical solutions and advantages of the present application more clear, the present application will be further described below in detail in combination with the embodiments and with reference to the drawings. It should be understood that the specific embodiments described herein are only used to explain the present application and are not used to limit the present application.

On the contrary, the present application covers any replacement, modification, equivalent method and solution defined by the claims within the essence and scope of the present application. Further, in order to make the public better understand the present application, some specific details are described in detail in the following detailed description of the present application. For those skilled in the art, the present application can be fully understood without the description of these details.

It should be noted that when two components are called "fixedly connected", the two components may be directly connected or there may be an intermediate component. On the contrary, when a component is called "directly on" another component, there is no intermediate component. Expressions such as "up" and "down" used herein are for descriptive purposes only.

Figure 2:
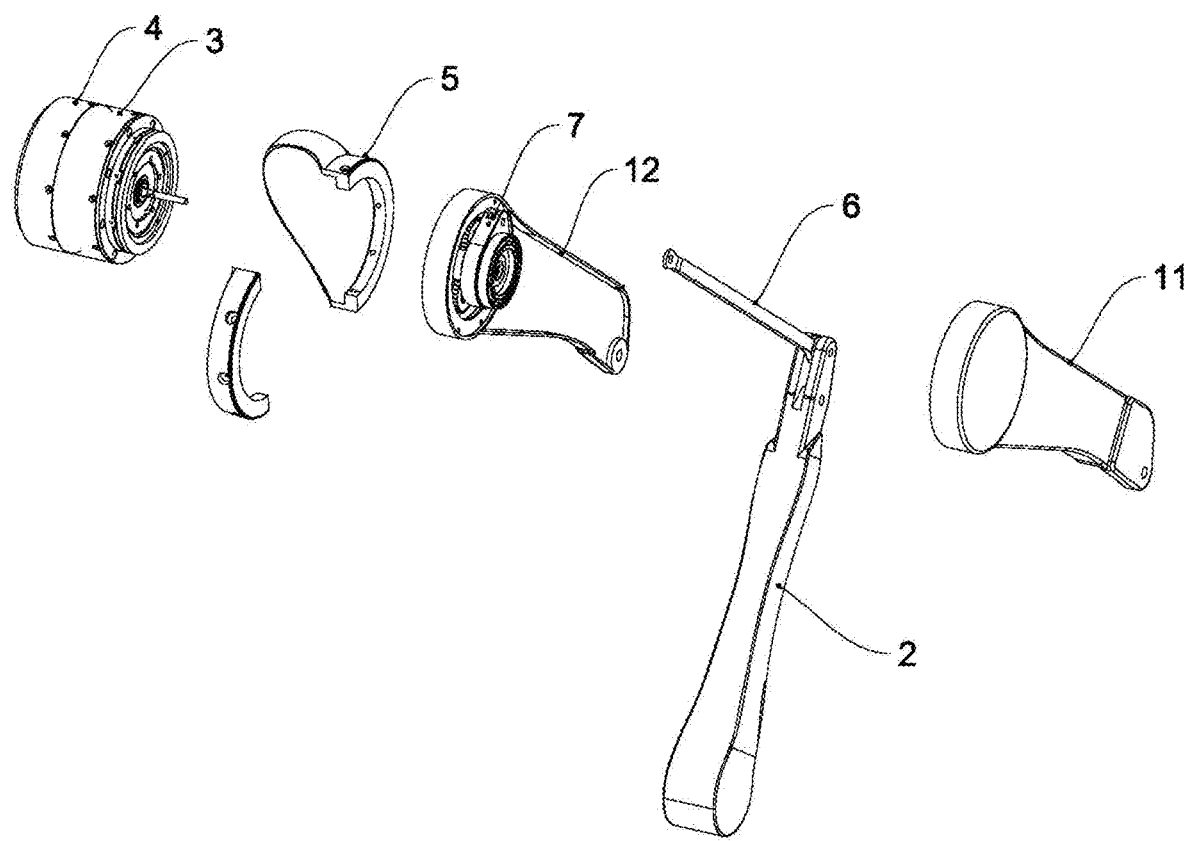
FIG. 2 illustrates a schematic view of an exploded structure of the present application.
Figure 3:
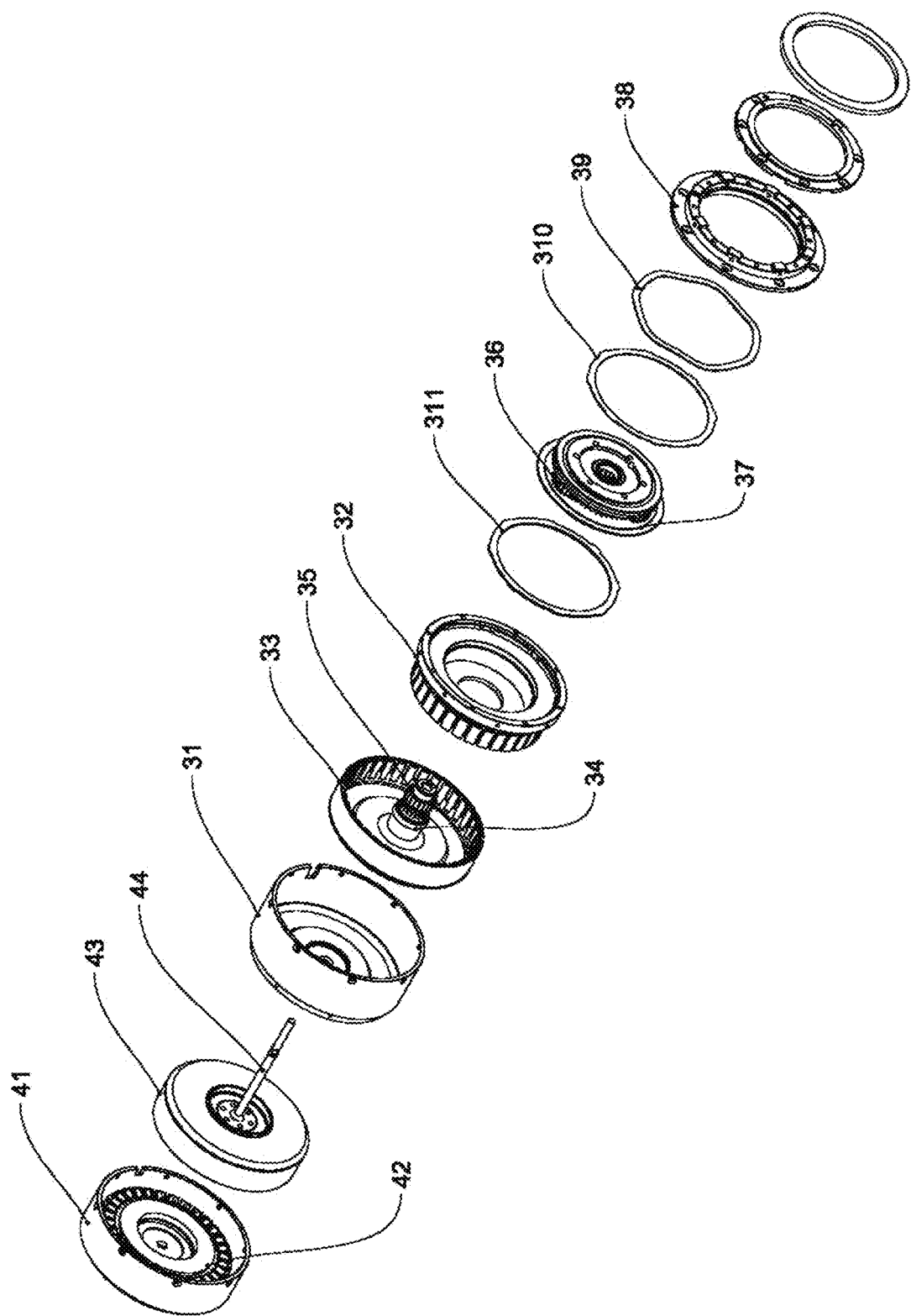
FIG. 3 illustrates a schematic view of an exploded structure of a first motor and reducer assembly and a second motor assembly of the present application.
Figure 4:
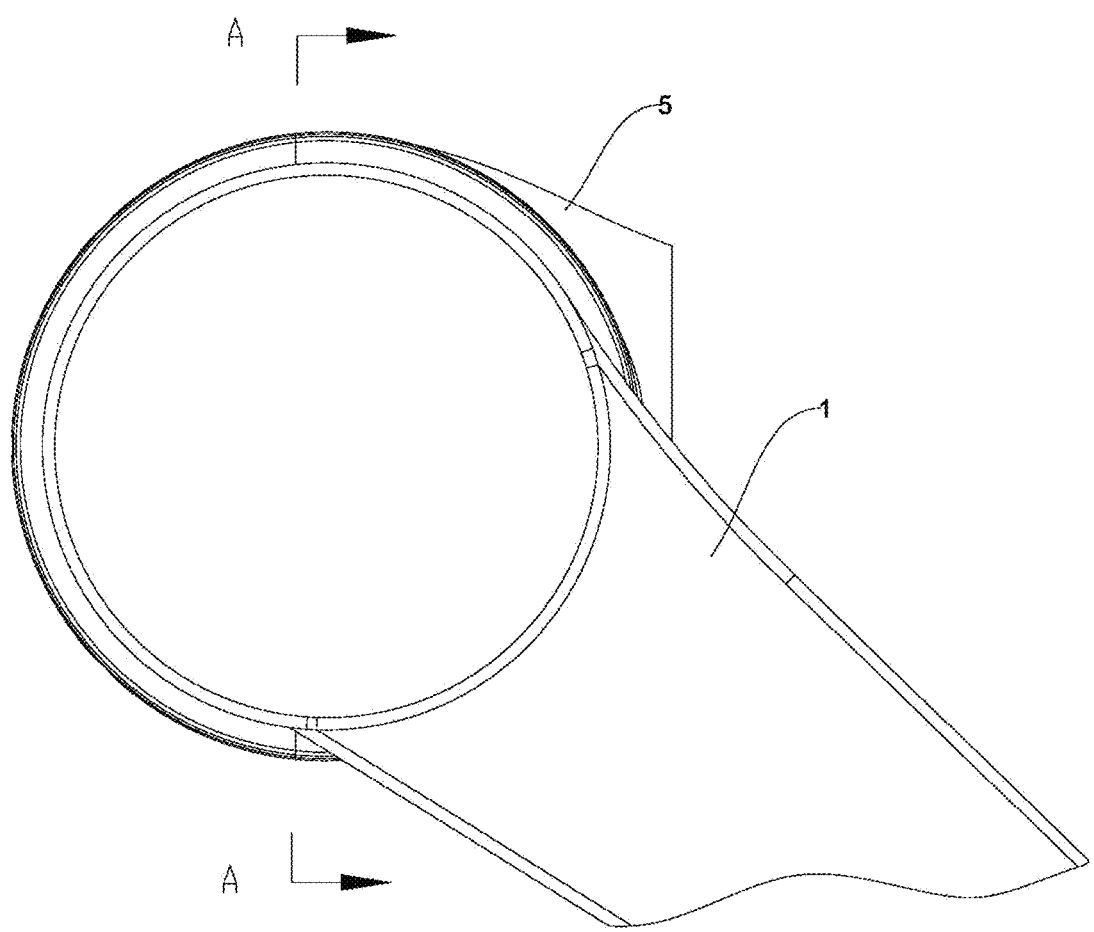
FIG. 4 illustrates a partial top view of the present application.
Figure 5:
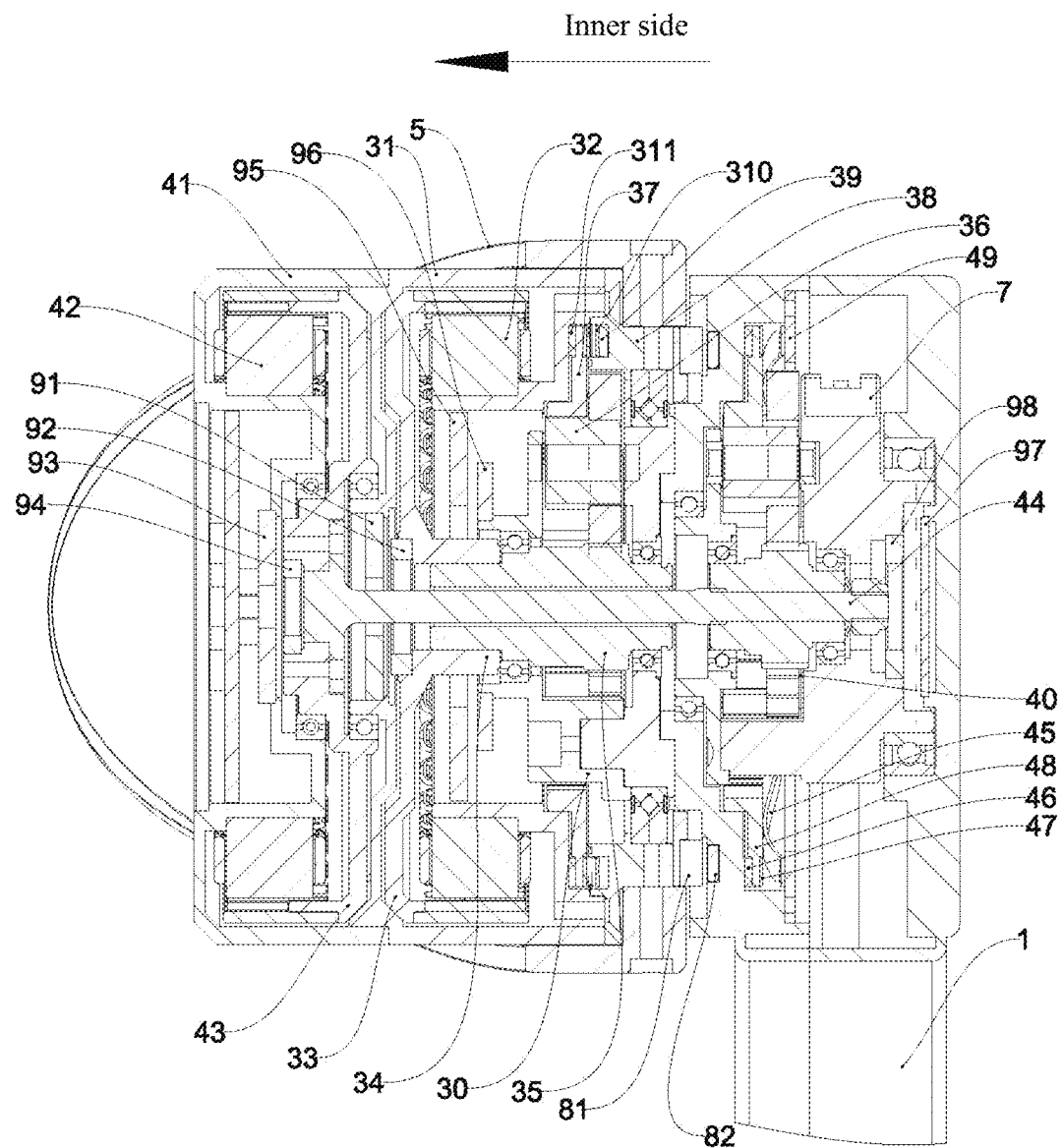
FIG. 5 illustrates a sectional view of section A-A of the present application.
Figure 6:
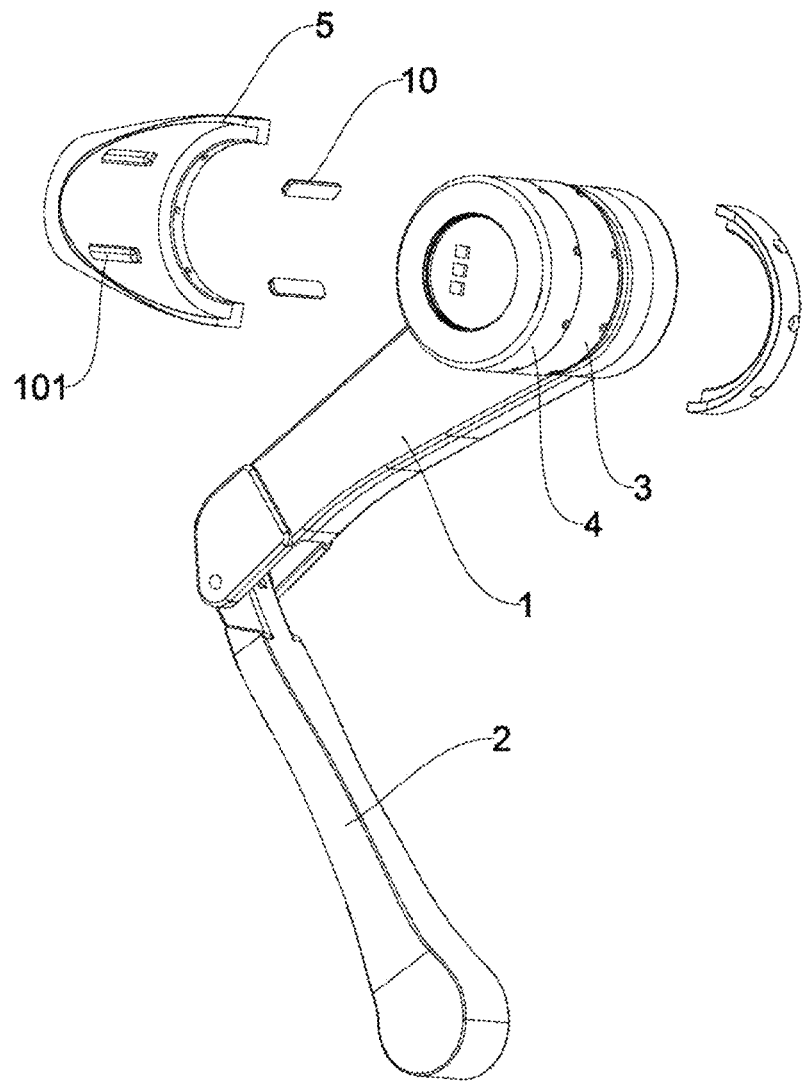
FIG. 6 illustrates a schematic view of a heat conduction structure of the present application.

Referring to FIG. 1 to FIG. 6, a robot integrated joint unit includes a first motor and reducer assembly 3, a second motor assembly 4, a second reducer assembly 40 and a first output connecting rod 1; a first output connecting rod 1 is mounted on one side of an output shaft end of the first motor and reducer assembly 3; the second motor assembly 4 is fixedly mounted on the other side of the first motor and reducer assembly 3; the second reducer assembly 40 is disposed in the first output connecting rod 1; an output shaft of the second motor assembly 4, i.e., a second output shaft 44, passes through a rotation center of the first motor and reducer assembly 3 and is fixedly connected with an input end of the second reducer assembly 40. This structural arrangement improves the degree of integration of the dual joint unit and reduces the axial size of the joint unit; by disposing the dual motors of the dual joints on the same side of the joint, the motor power cable does not need to pass through the joint and the fatigue damage of the motor power cable is avoided.

The first output connecting rod 1 is further rotatably connected with a second output connecting rod 2. The first output connecting rod 1 includes a first housing 11 and a second housing 12. The first housing 11 and the second housing 12 are fixedly connected together to form a holding cavity. The second reducer assembly 40 is fixed in the holding cavity. A joint output rocker arm 7 is fixed at an output end of the second reducer assembly 40. A connecting rod 6 is further disposed in the holding cavity. One end of the connecting rod 6 is rotatably connected with the joint output rocker arm 7. The other end is rotatably connected with the second output connecting rod 2. The joint output rocker arm 7 rotates and drives the second output connecting rod 2 to rotate relative to the first output connecting rod 1 through the connecting rod 6.

The first motor and reducer assembly 3 is provided with a first motor assembly and a first reducer assembly 30. The first motor assembly includes a first motor stator and winding 32 and a first motor rotor 33 rotatably connected with a first motor housing 31. The first motor stator and winding 32 are fixed in the first motor housing 31. A first output shaft 34 is coaxially fixed at a rotation center of the first motor rotor 33. The first motor assembly transmits power to the first reducer assembly 30 through the first output shaft 34. The first motor assembly adopts an outer rotor motor, making the overall structure of the first motor and reducer assembly 3 more compact. The first reducer assembly 30 includes a first sun gear 35, a first planetary gear 36, a first inner ring gear 37 and a planetary carrier, which form a planetary gear reducer. Under a normal condition, the first inner ring gear 37 is fixed, and the power transmitted from the first motor assembly to the first reducer assembly 30 is output to the first output connecting rod 1 through the planetary carrier. The first sun gear 35 is coaxially and fixedly connected with the first output shaft 34. The fixed connection mode may be integrated molding, or other fixation modes such as welding and interference fitting. The first planetary gear 36 is a dual gear. Compared with the conventional planetary gear, the use of the dual gear as the first planetary gear 36 can achieve higher reduction ratio on the premise of only slightly increasing the weight and volume of the reducer.

The second motor assembly 4 includes a second motor stator and winding 42 and a second motor rotor 43 rotatably connected with a second motor housing 41. The second motor stator and winding 42 are fixed in the second motor housing 41. The second output shaft 44 is coaxially fixed at a rotation center of the second motor rotor 43.

An embodiment of additionally disposing a first torque limiter in the present application is as follow:

The first reducer assembly 30 includes a first planetary gear reducer and a first torque limiter. The first torque limiter includes a first friction force generator 39. The first planetary gear reducer includes a first inner ring gear 37. The outer ring side of the first inner ring gear 37 is abutted with the first friction force generator 39. The first torque limiter further includes a first disc pad 310 and a first friction disc 311. The first disc pad 310 is disposed on the side of the outer ring side of the first inner ring gear 37 close to the first friction force generator 39. The first friction disc 311 is disposed on the other side of the outer ring side of the first inner ring gear 37. The first friction force generator 39 includes but is not limited to a disc spring, a wave spring and a coil spring. A first motor base 38 tightly presses the first friction force generator 39 to achieve pressure preloading. The first friction force generator 39 may also adopt an active control unit, including but not limited to an electromagnet and an electrostrictive material, which can also provide axial pressure to the first inner ring gear 37. When the active control unit is adopted, the first friction force generator 39 can dynamically adjust the axial pressure on the first inner ring gear 37 in real time according to the actual needs, that is, it can dynamically adjust the maximum friction torque on the first inner ring gear 37 in real time, so that the joint unit adapts to various working conditions. The structure is compact and reliable, and the cost is low.

When the external force torque on the first inner ring gear 37 is less than or equal to the friction torque applied by the first friction force generator 39 to the first inner ring gear 37, the first inner ring gear 37 is fixed; when the external force torque on the first inner ring gear 37 is greater than the friction torque applied by the first friction force generator 39 to the first inner ring gear 37, the first inner ring gear 37 rotates by friction. By disposing the first torque limiter, the external impact on the output end of the joint is prevented from damaging the first reducer assembly 30 and other parts in the joint unit; and the slip situation during the operation of the first torque limiter can balance the wear of the reducer in daily operation.

An embodiment of additionally disposing a second torque limiter in the present application is as follow:

The second reducer assembly 40 includes a second planetary gear reducer and a second torque limiter. The second torque limiter includes a second friction force generator 45. The second planetary gear reducer includes a second inner ring gear 48. The outer ring side of the second inner ring gear 48 is abutted with the second friction force generator 45. The second torque limiter further includes a second friction disc 46 and a second disc pad 47. The second disc pad 47 is disposed on the side of the outer ring side of the second inner ring gear 48 close to the second friction force generator 45. The second friction disc 46 is disposed on the other side of the outer ring side of the second inner ring gear 48. By disposing the second friction disc 46 and the second disc pad 47, the future maintenance and replacement are facilitated. The second friction force generator 45 includes but is not limited to a disc spring, a wave spring and a coil spring. The pressing plate 49 tightly presses the second friction force generator 45 to achieve pressure preloading. The second friction force generator 45 may also adopt an active control unit, including but not limited to an electromagnet and an electrostrictive material, which can also provide axial pressure to the second inner ring gear 48. When the active control unit is adopted, the second friction force generator 45 can dynamically adjust the axial pressure on the second inner ring gear 48 in real time according to the actual needs, that is, it can dynamically adjust the maximum friction torque on the second inner ring gear 48 in real time, so that the joint unit adapts to various working conditions. The structure is compact and reliable, and the cost is low.

When the external force torque on the second inner ring gear 48 is less than or equal to the friction torque applied by the second friction force generator 45 to the second inner ring gear 48, the second inner ring gear 48 is fixed; when the external force torque on the second inner ring gear 48 is greater than the friction torque applied by the second friction force generator 45 to the second inner ring gear 48, the second inner ring gear 48 rotates relatively. By disposing the second torque limiter, the external impact on the output end of the joint is prevented from damaging the second reducer assembly 40 and other parts in the joint unit; and the slip situation during the operation of the second torque limiter can balance the wear of the reducer in daily operation.

An embodiment of additionally disposing a hollow shaft in the present application is as follow:

The second motor assembly 4 is provided with a second output shaft 44, and the first motor and reducer assembly 3 is provided with a hollow shaft structure, so that the second output shaft 44 passes through the first motor and reducer assembly 3 and is fixedly connected with the input end of the second reducer assembly 40. This structure realizes the high integration of the dual joint unit, avoids the need for the motor power cable to pass through the joint, and avoids the fatigue damage of the motor power cable.

An embodiment of additionally disposing motor encoders and output encoders in the present application is as follow:

The first motor and reducer assembly 3 is provided with a first motor encoder and a first output encoder. The second motor assembly 4 is provided with a second motor encoder. The second reducer assembly 40 is provided with a second output encoder. The first motor encoder includes a first motor encoder stator 91 and a first motor encoder rotor 92. The first motor encoder stator 91 is fixedly disposed on the first motor housing 31. The first motor encoder rotor 92 is fixedly connected with the first motor rotor 33. The first output encoder includes a first output encoder stator 95 and a first output encoder rotor 96. The first output encoder stator 95 is fixedly disposed on the first motor stator and winding 32. The first output encoder rotor 96 is fixedly connected with the planetary carrier of the first reducer assembly 30. The second motor encoder includes a second motor encoder stator 93 and a second motor encoder rotor 94. The second output encoder includes a second output encoder stator 97 and a second output encoder rotor 98. Using dual encoders can more accurately detect the rotation angle of the motor and the rotation angle of the joint output end at the same time, thus improving the controlled performance of the joint. In addition, the dual encoders can accurately detect the rotation angle of the joint output end when the torque limiter of the joint has a limiting effect. Since the second motor encoder and the second output encoder are respectively disposed at the two ends, no parts need to pass through the second motor encoder and the second output encoder. Therefore, during the selection of the second motor encoder and the second output encoder, the encoder with no hole in the center can be selected, so the cost is reduced.

An embodiment of additionally disposing a wireless electric energy transmission component and a wireless signal transmission component in the present application is as follow:

The robot dual joint unit includes a wireless electric energy transmission component and a wireless signal transmission component. The wireless electric energy transmission component includes a transmitting coil and a receiving coil. The transmitting coil and the receiving coil may be circular or in other regular or irregular shapes. In order to improve the transmission efficiency of electric energy, the transmitting coil and the receiving coil are disposed relatively in parallel. The wireless signal transmission component adopts a radio transmission mode, an infrared light transmission mode or a laser transmission mode. The wireless electric energy transmission component and the wireless signal transmission component realize the electric energy transmission between the rotating joints, omit the joint jumper cable, realize the continuous rotation of the joint and increase the working space of the joint.

The wireless electric energy transmission component is used to supply power to components on the first output connecting rod 1 and other components subsequently connected with the first output connecting rod 1. The wireless signal transmission component is used to communicate with components on the first output connecting rod 1 and other components subsequently connected with the first output connecting rod 1. By disposing the wireless electric energy transmission component and the wireless signal transmission component, the joint jumper cable is omitted, and the structure is simple and reliable.

The wireless electric energy transmission component and the wireless signal transmission component are disposed between the first motor and reducer assembly 3 and the first output connecting rod 1, or are disposed in the first motor and reducer assembly 3. By mounting the wireless electric energy transmission component and the wireless signal transmission component at different positions, the wireless transmission of electric energy and signals is realized, the mounting position can be selected according to the actual needs, and it helps to improve the degree of integration of the joint unit.

An embodiment of additionally disposing a joint adapter 5 and a motor heat dissipation component in the present application is as follow:

The first motor and reducer assembly 3 includes a first motor housing 31. A joint adapter 5 is fixed on an outer side of the first motor housing 31. The joint adapter 5 is provided with a concave structure covering the first motor and reducer assembly 3. By unscrewing the screws used to fix the joint adapter 5 and the first motor and reducer assembly 3, the disassembly and assembly of dual joints can be realized, the structure is compact and reliable, and the weight is light. A motor driver and a motor heat conduction and dissipation component are fixed on the first motor and reducer assembly 3 and the second motor assembly 4. A heat conduction member 10 of the motor heat conduction and dissipation component is disposed in a heat conduction groove 101 between the joint adapter 5 and the first motor housing 31. The integration of the joint unit is further improved, and the heat dissipation effect of the joint unit is better.

In the robot dual joint unit provided by the present application, both the first motor and reducer assembly 3 and the second motor assembly 4 adopt outer rotor motors. By using the external rotor motors, the production process is simple and the cost is low.

The present application further provides a legged robot, which includes the robot integrated joint unit according to any one of the above embodiments.

In the present application, the fixed connection mode may be threading, welding, riveting, insertion, or connection through a third component, which may be selected by those skilled in the art according to the actual situation.

The above embodiments are only exemplary embodiments of the present application and should not limit the scope of protection of the present application. Any non-substantive changes and replacements made by those skilled in the art on the basis of the present application belong to the scope of protection of the present application.

The invention claimed is:

1. A robot integrated joint unit, comprising:
   a first motor and reducer assembly;
   a first output connecting rod mounted on one side of an output shaft end of the first motor and reducer assembly;
   a second motor assembly fixedly mounted on another side of the first motor and reducer assembly;
   a second reducer assembly disposed in the first output connecting rod; and
   a joint adapter fixed on and around an outer circumferential surface of the first motor and reducer assembly, the joint adapter having a concave structure extending around and covering the outer circumferential surface of the first motor and reducer assembly,
   wherein an output shaft of the second motor assembly passes through the first motor and reducer assembly and is fixedly connected with an input end of the second reducer assembly, and
   wherein the first motor and reducer assembly is provided with a first reducer assembly; the first reducer assembly and the second reducer assembly are respectively a planetary reducer; planetary gears of the first reducer assembly and the second reducer assembly are dual gears; outer rings of inner gear rings of the first reducer assembly and the second reducer assembly are respectively and frictionally connected with a first friction disc and a second friction disc.

2. The robot integrated joint unit according to claim 1, wherein the first motor and reducer assembly and the second motor assembly adopt an outer rotor motor.

* * * * *